Figure 1:
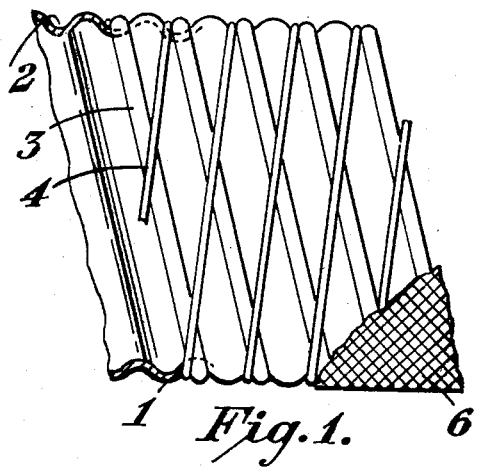

Oct. 11, 1955   C. B. V. NEILSON   2,720,221
FLEXIBLE METALLIC HOSE
Filed Dec. 23, 1952

Inventor:
Christopher C. V. Neilson
By his Attorneys:
Baldwin & Wight

United States Patent Office 2,720,221
Patented Oct. 11, 1955

2,720,221

FLEXIBLE METALLIC HOSE

Christopher Bernard Vere Neilson, Lymm, England, assignor to Electro-Hydraulics Limited, Warrington, England, a British company Application December 23, 1952, Serial No. 327,528

6 Claims. (Cl. 138—50)

This invention relates to flexible metallic hose and concerns such hose which has to be used for conveying fluid under high pressure.

High pressure flexible hose commonly in use consists of reinforced plastic materials, like natural or artificial rubber. Hoses of this type have the disadvantage that the elastic material deteriorates at certain temperatures, say at −40° C. As high pressure fluid systems are required to work satisfactorily in ambient temperatures below those mentioned above, flexible hoses known hitherto cannot be employed. Various proposals have been put forward, such, for example, as rigid metallic pipes capable of swivelling in one or more planes, but these proposals provide no satisfactory solution in certain circumstances, where free flexible movement of the pipe is required.

Another proposal has been the use of a metal pipe made in the form of bellows, in such a way that an axial section through the pipe wall is corrugated, but this construction is only suitable for relatively low pressures, as the material must be thin, and the effect of higher pressures would tend to extend the length of the pipe and to blow the inward corrugations out, thus flattening the pipe wall. In another known arrangement, a metallic hose has been reinforced by surrounding it with a braided wire cylinder or sleeve; such an arrangement however, can only be used for conveying fluid under low pressure.

It is an object of this invention to overcome these disadvantages and to provide a metallic flexible hose capable of withstanding high pressure and continued vibration at low ambient temperatures such as, for example, required on aircraft for flight in high altitudes.

According to the present invention, metallic hose comprises a flexible metallic tube formed with a continuous helical groove, smoothly undulating in longitudinal section, and reinforcing wire inserted in the groove.

The term "helical," as herein used, is not intended to be limited to its normal geometrical sense, but is intended to cover a groove running continuously round and throughout the length of the tube.

The groove in the metallic tube is preferably substantially semi-circular in section so as to fit the reinforcing wire, the space or humps between two turns of the helical groove being also substantially semi-circular in shape, in the opposite sense to the groove, i. e. outwards.

The said metallic tube is preferably relatively thin walled so as to provide flexibility and any circumferential stresses set up by internal pressure within the tube are relieved by the reinforcing wire, as in the case of wire wound pressure vessels.

It will be seen that the formation of the tube and the disposition of the reinforcing wires react the loads due to the pressure in the fluid, while maintaining flexibility of the overall construction; thus the tube wall is relatively thin and is formed so as to withstand the pressure between two adjacent turns of the reinforcing wire, and the reinforcing wire to withstand the main pressure in the cylinder tube. An outer layer of wire or braid may be added to withstand the out-of-balance end loads or torsional loads due to the fluid pressure.

Figure 2:
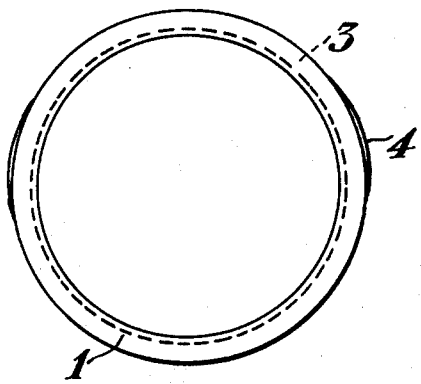
Figure 4:
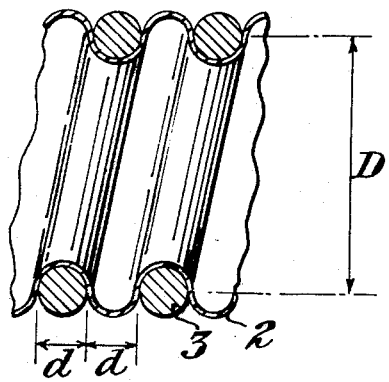
Figure 3:
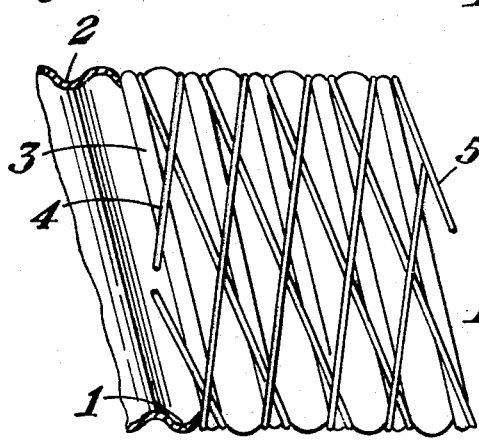

The invention is diagrammatically illustrated in the accompanying drawing in which Figure 1 is a side elevation, partly in section of one form, Figure 2 being an end elevation thereof, whilst Figure 3 is a view similar to Figure 1 of a modified form; Figure 4 is a sectional view of a tube with a single reinforcing wire to an enlarged scale.

Referring to Figures 1 and 2 a metallic hose comprises a thin walled metallic tube 1 provided with a continuous helical groove 2 in which is inserted a reinforcing wire 3, the wire strengthening the tube radially against pressure exerted, when the tube is in use, by the fluid therein. Between the radially outer parts of the humps and adjacent parts of the reinforcing wire 3 there are formed substantially wedge shaped recesses, as best shown in Figure 4. One or more additional laps of wire 4, 5 may be wound over the first reinforcing wire and be seated or wedged in the wedge shaped recesses to react the out-of-balance end or torsional loads, one such wire 4 being shown in Figure 1 and two such wires 4 and 5 being shown in Figure 3. Alternatively or additionally the reinforced tube can be surrounded by a braid 6 for this purpose, as shown at the bottom right hand corner of Figure 1.

The tube may be made out of any known metal, preferably out of Phosphor bronze, metal known under the registered trademark Monel, or K. Monel, stainless steel and the like. Where the material is capable of being heat treated after forming, in order to increase its strength, this may be conveniently done.

The loads to be taken up by the strengthening wire 3 can be calculated as follows, with reference to Figure 4. As the tube 2 is relatively thin, the mean diameter "D" passes through the centre of the reinforcing wire 3, if the wall thickness of the tube is neglected, which can be done for practical purposes. The diameter of the grooves and the diameter of the reinforcing wire is identical and denoted by "d." Assuming the helix angle to be θ

$$\tan \theta = \frac{d}{D}$$

and the tension stress in the tube =

$$\frac{dp}{2t}$$

if $t$ is the thickness of the tube, and the tension stress in the reinforcing wire equals $$\frac{2dDp}{2a \cos \theta}$$

or simplified $$\frac{4Dp}{\pi d \cos \theta}$$

I claim:

1. Metallic hose comprising a flexible metallic tube having a continuous helical groove and being smoothly undulating in longitudinal section with an outer surface constituted by symmetrical, smoothly curved humps and intervening recesses; a reinforcing wire wrapped around said tube in said groove, there being substantially wedge shaped recesses between the radially outer parts of said reinforcing wire and the adjacent humps on said tube; and a second wire of smaller cross-section than said reinforcing wire wrapped helically around the assembly constituted by said tube and said reinforcing wire reversely to the wrapping of said reinforcing wire so as to cross over convolutions of said reinforcing wire at points along said tube and to extend into said wedge shaped recesses in wedged engagement between said tube and said reinforcing wire at other points regularly spaced along said tube.

2. Metallic hose as set forth in claim 1 in which a third wire, also smaller in cross-section than said reinforcing wire, is wrapped around said assembly constituted by said tube and said reinforcing wire helically in the same direction as said reinforcing wire.

3. Metallic hose as set forth in claim 2 in which said third wire crosses over convolutions of said reinforcing wire at points spaced along said tube and extends into said wedge shaped recesses at other points spaced along said tube.

4. Metallic hose comprising a flexible metallic tube having a continuous helical groove; a reinforcing wire wrapped around said tube in said groove; and a second wire of smaller cross-section than said reinforcing wire, wrapped helically around the assembly constituted by the tube and said reinforcing wire reversely to the wrapping of said reinforcing wire, said second wire crossing over convolutions of said reinforcing wire at points along said tube and extending into said groove in wedged engagement with said tube and said reinforcing wire at other points regularly spaced along said tube to form means for counteracting the out of balance end loads and torsional loads of said metallic tube and said reinforcing wire.

5. Metallic hose comprising a flexible metallic tube having a continuous helical groove and being smoothly undulating in longitudinal section with an outer surface constituted by symmetrical, smoothly curved humps and intervening recesses; a reinforcing wire wrapped around said tube in said groove and being of a cross-sectional diameter substantially equal to the radial distance from the root of said depressions to the outermost part of said humps, the curvature of said reinforcing wire and the curvature of said humps forming substantially wedge shaped recesses between the radial outer parts of said reinforcing wire and adjacent humps on said tube; and a second wire of smaller cross-sectional diameter than said reinforcing wire wrapped helically around the tube and said reinforcing wire reversely to the wrapping of said reinforcing wire so as to cross over convolutions of said reinforcing wire at points along said tube and to extend into said wedge shaped recess in wedged engagement between said tube and said reinforcing wire at other points regularly spaced along said tube.

6. Metallic hose comprising a flexible metallic tube having a continuous helical groove and being smoothly undulating in longitudinal section with an outer surface constituted by symmetrical, smoothly curved humps and intervening recesses; a reinforcing wire wrapped around said tube in said groove and being of a cross-sectional diameter substantially equal to the radial distance from the root of said depressions to the outermost parts of said humps, the curvature of said reinforcing wire and the curvature of said humps forming substantially wedge shaped recesses between the radial outer parts of said reinforcing wire and adjacent humps on said tube; a second wire of smaller cross-sectional diameter than said reinforcing wire wraped helically around the tube and said reinforcing wire reversely to the wrapping of said reinforcing wire so as to cross over convolutions of said reinforcing wire at points along said tube and to extend into said wedge shaped recesses in wedged engagement between said tube and said reinforcing wire at other points regularly spaced along said tube; and a covering of braid of high tensile material surrounding and further reinforcing the assembly constituted by said tube, said reinforcing wire, and said second wire.

References Cited in the file of this patent

UNITED STATES PATENTS

| 1,284,956 | Emrick | Nov. 12, 1918 |
| 1,688,303 | Carpenter | Oct. 16, 1928 |
| 1,819,175 | James | Aug. 18, 1931 |
| 1,925,231 | Bundy | Sept. 5, 1933 |
| 2,367,944 | Dugalls | Jan. 23, 1945 |
| 2,616,728 | Pitt | Nov. 4, 1952 |

FOREIGN PATENTS

| 328,650 | France | of 1903 |
| 414,233 | Great Britain | Aug. 2, 1934 |
| 516,564 | France | Dec. 8, 1920 |